J. P. SWAN.
PIPE HANGER.
APPLICATION FILED AUG. 30, 1911.
1,062,373.
Patented May 20, 1913.
Fig. 1.
Fig. 2.
Fig. 3.
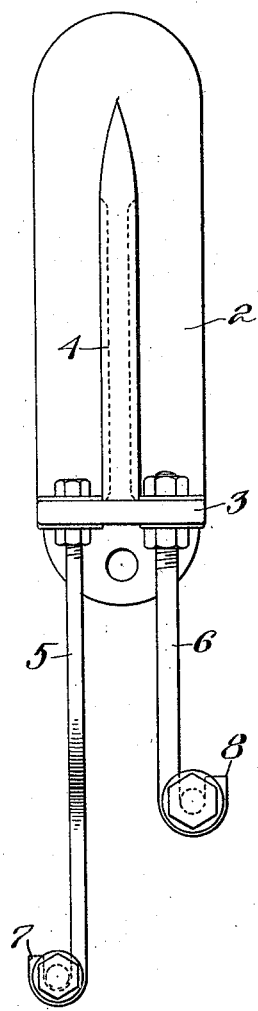
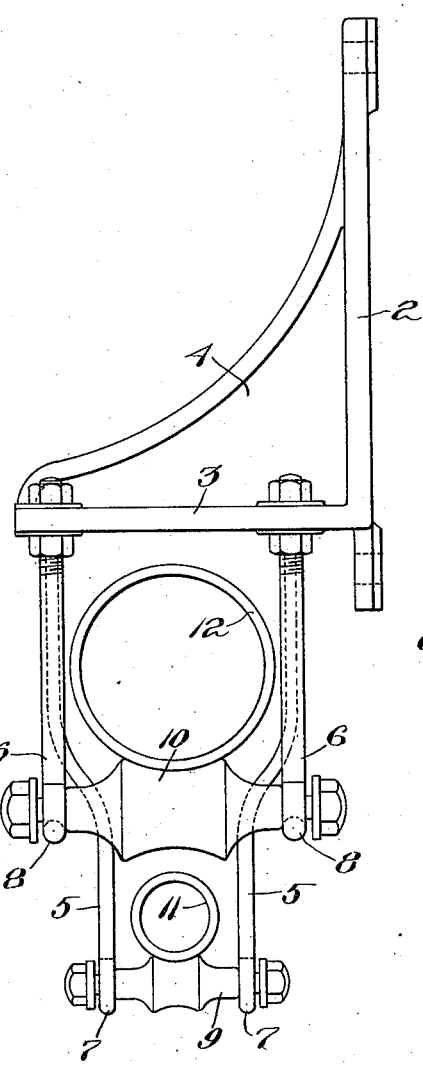
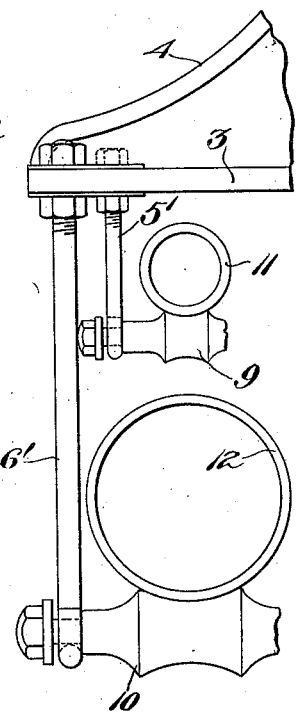
Witnesses:
Joseph T. Brennan.
A. B. Lindsay.
Inventor:
John P. Swan,
by E. D. Chadwick, Atty.

UNITED STATES PATENT OFFICE.

JOHN PUTNAM SWAN, OF PROVIDENCE, RHODE ISLAND, ASSIGNOR TO GENERAL FIRE EXTINGUISHER COMPANY, OF PROVIDENCE, RHODE ISLAND, A CORPORATION OF NEW YORK.

PIPE-HANGER.

1,062,373.          Specification of Letters Patent.      Patented May 20, 1913.

Application filed August 30, 1911. Serial No. 646,793.

*To all whom it may concern:*

Be it known that I, JOHN P. SWAN, a citizen of the United States, residing at Providence, in the county of Providence and State of Rhode Island, have invented new and useful Improvements in Pipe-Hangers, of which the following is a specification.

This invention is intended to provide an improved hanger for supporting the supply and return pipes of a hot water heating system, one above the other, in such manner as to provide for the adjustments necessary for giving them the desired pitch in opposite directions.

The features of construction and arrangement in which my invention reside are hereinafter described in connection with the accompanying drawings, in which—

Figure 1 is a front elevation of one form of the hanger; Fig. 2 is a side elevation of the same, showing the pipes supported thereby; and Fig. 3 is a partial view similar to Fig. 2 but illustrating a slight modification.

The hanger illustrated in Figs. 1 and 2 comprises a supporting bracket 2 which is adapted to be rigidly secured to a vertical wall and has an outwardly-extending arm 3 connected to the vertical portion of the bracket by a strengthening web 4. On opposite sides of said web the horizontal flanges of the arm 3 are provided with perforations through which pass the threaded upper portions of two pairs of supporting rods 5 and 6, one pair on each side of the web 4, with adjusting and clamping nuts thereon. At their lower ends said rods 5 and 6 are provided respectively with hooks 7 and 8 or the like, in which are located bearing studs formed on the ends of horizontal rollers 9 and 10, each roller being concaved circumferentially at its center in accordance with the transverse curvature of the pipe to be supported thereby, so as to form a seat in which the pipe will be held by its own weight and thus prevented from moving laterally.

Inasmuch as the supply and return pipes are usually of different diameters, the roller for the smaller pipe 11 is preferably made shorter than the roller for the larger pipe 12, and in Fig. 2 is shown the arrangement employed for supporting the larger pipe above the smaller pipe. In this case the rods 5 have the same spacing at their upper ends as the rods 6, so as to leave room between them for the pipe 12, but are bent inward below said pipe to receive the roller 9, while in the modification shown in Fig. 3, which is employed when the smaller pipe is to be supported above the larger pipe, the rods 5' which carry the pipe 11 are nearer together throughout their lengths than the rods 6' which carry the pipe 12, being located wholly above the space occupied by the latter pipe.

As thus constructed, the pipes may be readily put in place or removed by first removing the rollers 9 and 10 from the hooks which carry them or by sliding the pipes endwise along said rollers, and the various supporting rods if made of appropriate lengths may be adjusted vertically to hold the pipes one above the other and give them the slight pitch from end to end which is usually required in practice, so that a compact and efficient hanger for the intended purpose is provided.

I claim as my invention:

A pipe hanger comprising a bracket having a horizontal arm, two pairs of independent supporting rods having threaded shanks passing through opposite edge portions of said arm, respectively, and provided with adjusting nuts, and two pipe supports carried by said pairs of rods respectively and located one above and in advance of the other, said supporting rods being spaced to receive the lower pipe between the rods of one pair and the upper pipe between the rods of both pairs.

In testimony whereof, I have hereunto subscribed my name this 29th day of August, 1911.

JOHN PUTNAM SWAN.

Witnesses:
  HENRY NICHOLS HORTON,
  JOSEPH FRANCIS CONLEY.

---

Copies of this patent may be obtained for five cents each, by addressing the "Commissioner of Patents, Washington, D. C."